United States Patent [19]

Terbush

[11] 4,395,664
[45] Jul. 26, 1983

[54] ENERGY CONVERSION APPARATUS

[76] Inventor: William G. Terbush, 1104 SW. 67th, Oklahoma City, Okla. 73125

[21] Appl. No.: 191,277

[22] Filed: Sep. 26, 1980

[51] Int. Cl.³ .............................................. H02P 1/54
[52] U.S. Cl. ................................... 318/112; 310/261; 318/140
[58] Field of Search ................... 310/102 R, 112, 113, 310/140, 144, 264, 265, 266, 269, 261, 263, 126; 318/45, 94, 102, 104, 112, 139

[56] References Cited

U.S. PATENT DOCUMENTS

| 236,399 | 1/1881 | Holcombe et al. |  |
|---|---|---|---|
| 308,601 | 12/1884 | Fitch . |  |
| 346,965 | 8/1886 | Warner . |  |
| 356,902 | 2/1887 | Thomson . |  |
| 381,421 | 4/1888 | Ries | 310/112 |
| 432,577 | 7/1890 | Spang | 310/112 |
| 501,961 | 7/1893 | Richardson | 310/126 X |
| 512,820 | 1/1894 | Henry | 310/113 |
| 1,508,100 | 9/1924 | Hawley | 310/112 X |
| 1,750,240 | 3/1930 | Myer | 310/112 X |
| 1,778,973 | 10/1930 | Frickey et al. | 323/204 |
| 1,794,977 | 3/1931 | Needham | 318/143 |
| 1,877,681 | 9/1932 | Mickey | 318/100 |
| 2,006,172 | 6/1935 | Klappauf | 310/112 X |
| 2,113,102 | 4/1938 | Whittle | 310/112 X |
| 2,480,844 | 9/1949 | Fox | 323/203 |
| 2,498,765 | 2/1950 | Pestarini | 290/40 R |
| 2,530,930 | 11/1950 | Allbert | 318/45 |
| 2,795,715 | 6/1957 | Gilchrist | 310/261 |
| 3,230,404 | 1/1966 | Graham | 310/263 X |
| 3,564,362 | 2/1971 | Hill | 318/45 |
| 3,603,823 | 9/1971 | Mason | 310/46 |
| 3,612,930 | 10/1971 | Raby . |  |
| 3,628,239 | 12/1971 | Hunt et al. . |  |
| 3,651,355 | 3/1972 | Mason | 310/112 |
| 3,723,796 | 3/1973 | Mason | 310/126 |

Primary Examiner—Ulysses Weldon
Attorney, Agent, or Firm—E. Harrison Gilbert, III

[57] ABSTRACT

Energy conversion apparatus is disclosed to include a drive shaft, a first magnetic pole extending substantially parallel to the drive shaft and spaced radially therefrom, a second magnetic pole extending substantially parallel to the drive shaft and spaced radially therefrom, and a plurality of drive armatures each connected to the drive shaft and extending radially therefrom toward the first and second magnetic poles. The apparatus further includes control switches for sequentially energizing each of the armatures.

13 Claims, 8 Drawing Figures

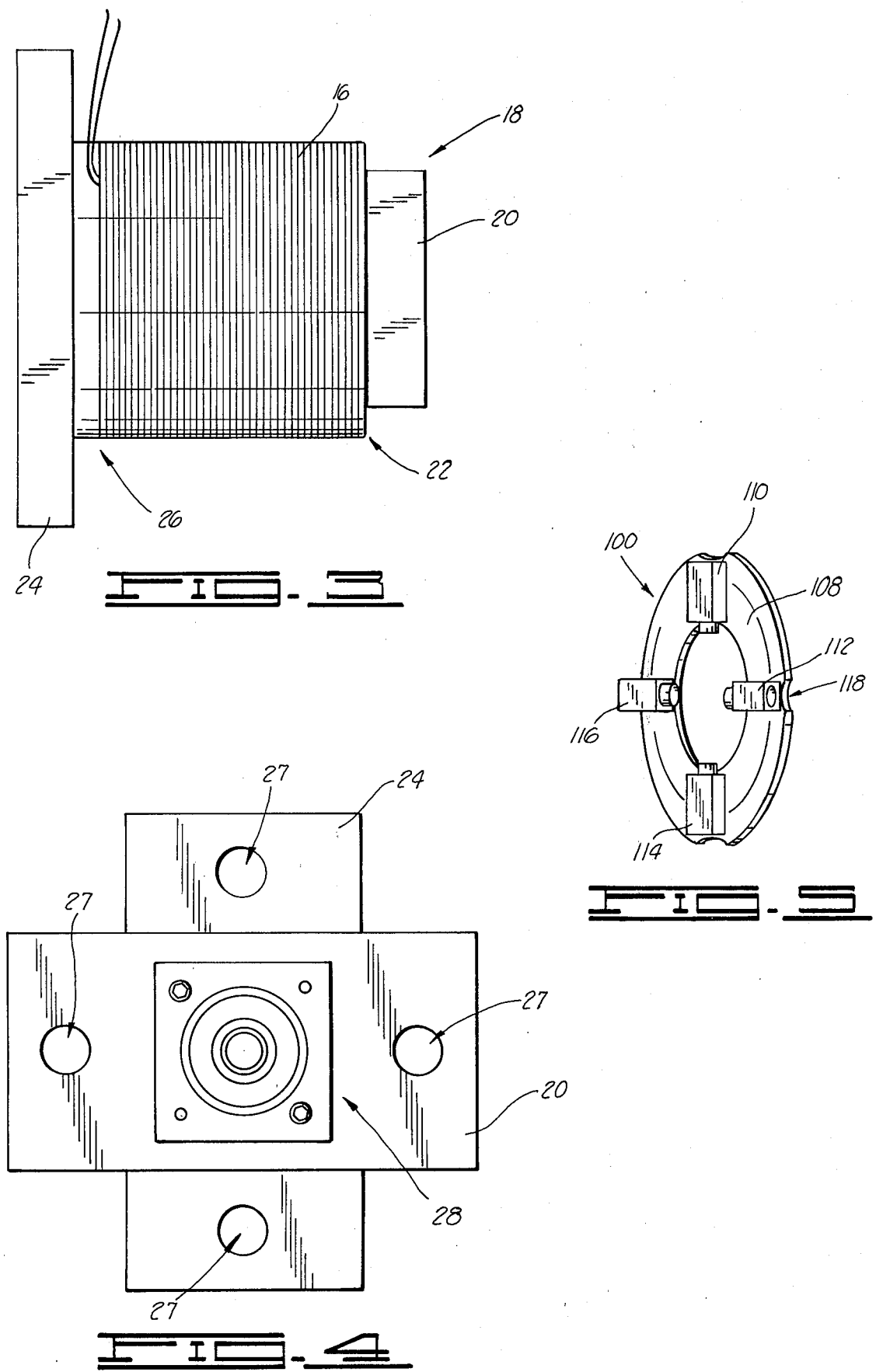

ENERGY CONVERSION APPARATUS

BACKGROUND OF THE INVENTION

This invention relates generally to energy conversion apparatus and more particularly, but not by way of limitation, to electric motors for vehicles.

Because of the dwindling supply of crude oil and the resultant high prices therefor, it is necessary to develop alternative means for providing mechanical energy derived from sources of energy other than crude oil. One such alternative means is an apparatus which converts electrical energy into mechanical energy, or more particularly, an electric motor. A specific use for such an alternative means is in vehicles presently powered by internal combustion engines which consume crude oil derivatives. By replacing internal combustion engines with electric motors utilizing sources of energy other than crude oil, the rapid depletion of our oil reserves will be slowed.

For such a replacement to be feasible, the electric motor must be comparable in weight and displacement to the internal combustion engine which it is to replace. Additionally, the electric motor must be able to power the vehicle for a reasonable distance without having to be recharged.

Although there have been proposed and/or manufactured electric motors for use in vehicles, I do not believe that any of such motors known to me have been proposed to be constructed and/or constructed in accordance with my invention as described and claimed hereinbelow.

SUMMARY OF THE INVENTION

The present invention overcomes the above-noted and other shortcomings of the prior art by providing a novel and improved energy conversion apparatus. This apparatus particularly includes an electric motor which is to be used where high efficiency power units are needed. The apparatus of my invention can be constructed so that it is at least comparable in weight and displacement to the weight and displacement of internal combustion engines which my invention is contemplated to replace.

Broadly, the present invention provides an energy conversion apparatus having a drive shaft, a first magnetic pole means extending substantially parallel to the drive shaft and spaced radially therefrom, a second magnetic pole means extending substantially parallel to the drive shaft and spaced radially therefrom, and a plurality of drive armature means, each being connected to the drive shaft and extending radially therefrom toward the first and second magnetic pole means. The apparatus further comprises means for generating an electromagnetic filed having a first magnetic polarization and a second magnetic polarization.

The first magnetic means of the motor includes a first field pole piece for linearly distributing the first magnetic polarization so that it interacts with each of the drive armature means. Additionally, the second magnetic means includes a second field pole piece for linearly distributing the second magnetic polarization so that it interacts with each of the drive armature means.

In one embodiment the drive armature means includes an electrically conductive armature coil and a member having first and second armature pole pieces radially spaced from the armature coil in electromagnetically responsive relation therewith so that the first armature pole piece has a first magnetic polarization and the second armature pole piece has a second magnetic polarization when the armature coil is electrically energized. Each of the first and second magnetic polarizations of the armature pole pieces interacts with the magnetic polarizations of the field pole pieces to cause the plurality of drive armature means to rotate the drive shaft.

The present invention further comprises control means for energizing a first one of the drive armatures at a first time and for energizing each other armature at successive times while maintaining the previously energized armatures energized.

From the foregoing it is a general object of the present invention to provide a novel and improved energy conversion apparatus. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 3 is a side elevation view of a preferred embodiment drive armature field means of the present invention.

FIG. 4 is an end elevation view of the field means shown in FIG. 3.

FIG. 5 is a perspective view of a brush plate of the present invention.

DETAILED DESCRIPTION OF THE PREFERRED EMBODIMENTS OF THE INVENTION

Figure 1:
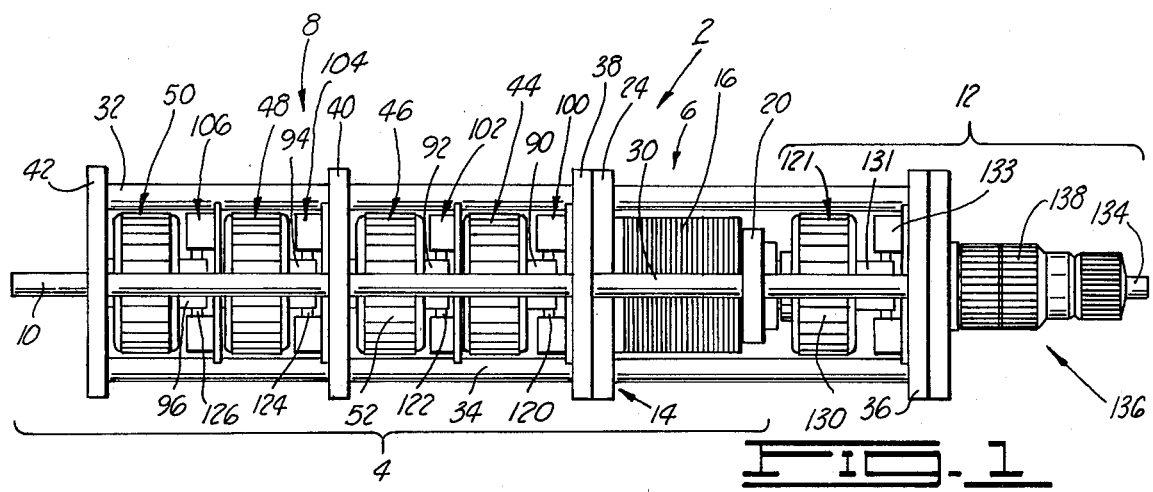
FIG. 1 is a side elevation view of a preferred embodiment of the present invention.

With reference to the drawings a preferred embodiment of the present invention will be described. FIG. 1 discloses an energy conversion apparatus 2 constructed in accordance with the present invention. The apparatus 2 includes a new and improved motor 4 broadly comprising driving armature field means 6 and drive armature means 8 mounted on a drive shaft 10. The apparatus 2 further includes generator means 12 (forming a part of a source of electrical energy) and control means 13 (see FIG. 8).

The drive armature field means 6 includes a field pole structure 14 and means for generating an electromagnetic field. The means for generating an electromagnetic field particularly includes a field coil 16 which, when energized, creates an electromagnetic field having a first magnetic polarization and a second magnetic polarization. The field coil 16 is electrically conductive and creates the necessary electromagnetic field when a current passes therethrough. The field coil 16 may include a suitable electrical wire wrapped around the field pole structure 14, or it may include any other suitable electrically conductive material which provides the necessary electromagnetic field when energized.

The field pole structure 14 is electromagnetically coupled with the field coil 16. In the preferred embodiment shown in the drawings, the field pole structure 14 includes a support member 18 having the field coil 16 mounted thereon. The support member 18 includes a first end plate 20 disposed adjacent a first end 22 of the field coil 16 and extending radially beyond the field coil 16. The support member 18 further includes a second end plate 24 disposed adjacent a second end 26 of the field coil 16 and extending radially beyond the field coil 16 along a line substantially perpendicular to the line along the first end plate 20 extends beyond the field coil 16. Each of the end plates 20 and 24 is made of steel or other electromagnetically responsive material. Each of the end plates 20 and 24 also has pole piece retaining holes 27 formed herein. As shown in FIG. 4, the first end plate 20 includes a bearing support structure 28 for journalling a generator drive shaft as subsequently described. In the preferred embodiment the bearing support structure 28 is constructed of aluminum; however, other suitable materials may be used.

The field pole structure 14 further includes first magnetic pole means having a first field pole piece 30 extending substantially parallel to the drive shaft 10 to which the drive armature means 8 is connected. The field pole piece 30 is spaced radially from the drive shaft 10 and is connected in magnetic relation with the first end plate 20. In the preferred embodiment, this magnetic relation arises by retaining the pole piece 30 in a first one of the holes 27 formed in the end plate 20. As shown in FIG. 1 the pole piece 30 extends perpendicularly from the end plate 20 beyond both the first and second ends 22 and 26 of the field coil 16. This connection between the first field pole 30 and the first end plate 20 electromagnetically associates the first field pole piece 30 with the field coil 16 so that the pole piece 30 has a first magnetic polarity. The first field pole piece 30 linearly distributes the first magnetic polarity along the length thereof for interacting with the drive armature means 8.

The field pole structure 14 further includes second magnetic pole means which also extends substantially parallel to the drive shaft 10 and is spaced radially therefrom in the preferred embodiment as shown in FIG. 1. The second magnetic pole means includes a second field pole piece 32 which is connected in magnetic relation with the second end plate 24 and extends perpendicularly therefrom beyond both the first and second ends 22 and 26 of the field coil 16. The second field pole piece 32 is connected with the second end plate 24 through one of the holes 27 thereof so that it is electromagnetically associated with the field coil 16 whereby the second field pole piece 32 has a second magnetic polarity. For the preferred embodiment shown in FIG. 1, the second field pole piece 32 linearly distributes the second magnetic polarity for interacting with the drive armature means 8.

Figure 2:
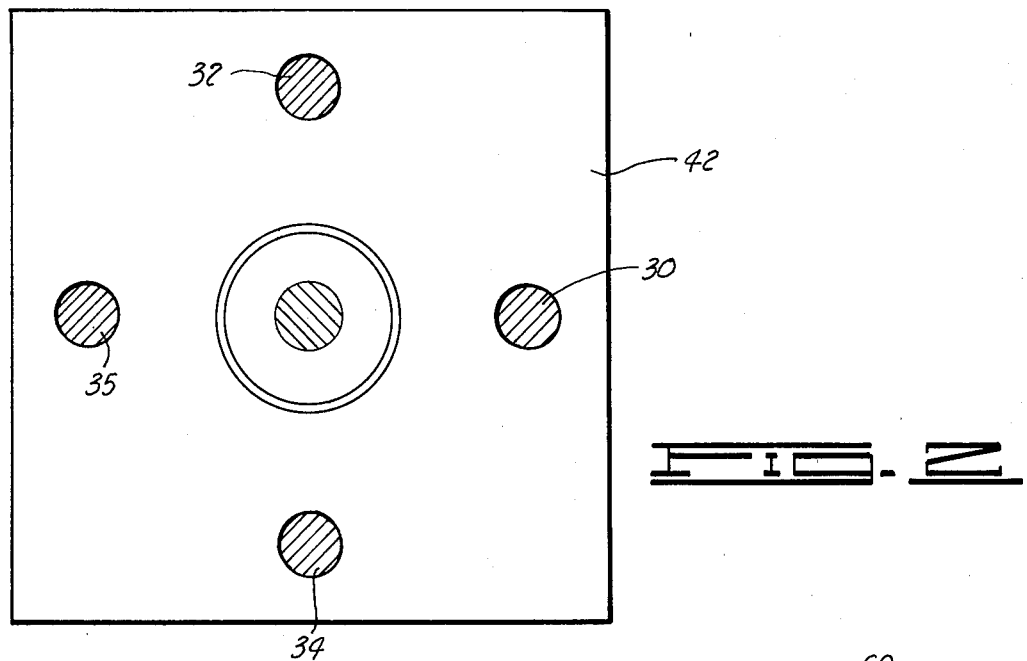
FIG. 2 is an end elevation view as viewed from the left end of the FIG. 1 embodiment.

In the preferred embodiment each of the pole pieces 30 and 32 is constructed of steel; however, other suitable electromagnetically responsive materials may be used. From the drawings it is apparent that the preferred embodiment includes four poles, three of which are identified in FIG. 1 by the reference numerals 30, 32 and 34. The fourth pole is identified in FIG. 2 by the reference numeral 35. Because of the specific construction of the support member 18 and the pole pieces 30, 32, 34 and 35 connected thereto, the first and fourth pole pieces 30 and 35 have a first magnetic polarity and the other two illustrated field poles 32 and 34 have a second magnetic polarity. Each of the field poles 30, 32, 34 and 35 is a pure field pole because each respective field pole has only a single magnetic polarity associated therewith.

To support the field poles 30-35 along their length as they extend beyond the field coil 16 and support member 18, there are a plurality of support plates 36, 38, 40 and 42 which are preferably made of aluminum or plastic, but which may be made of other non-magnetically responsive material. The support plates 36-42 also provide support for journalling the drive shaft 10 to which the drive armature means 8 is connected.

The drive armature means 8 of the present invention is shown to specifically include four armatures 44, 46, 48 and 50 mounted on the drive shaft 10 which in the preferred embodiment is positioned substantially coaxially with the field coil 16 as shown in FIG. 1. Each drive armature is electromagnetically responsive to the field coil 16 for providing rotational movement along the common axis provided by the drive shaft 10. Each drive armature includes a plurality of armature pole pieces 52 which are positioned radially between the drive shaft 10 and the first and second magnetic pole means 30 and 32. This placement of the armature pole pieces 52 permits them to interact with the field poles to provide rotational movement to the drive shaft 10. Each of the armatures 44-50 is connected to the drive shaft 10 in axially spaced relation with each of the other drive armatures.

Figure 7:
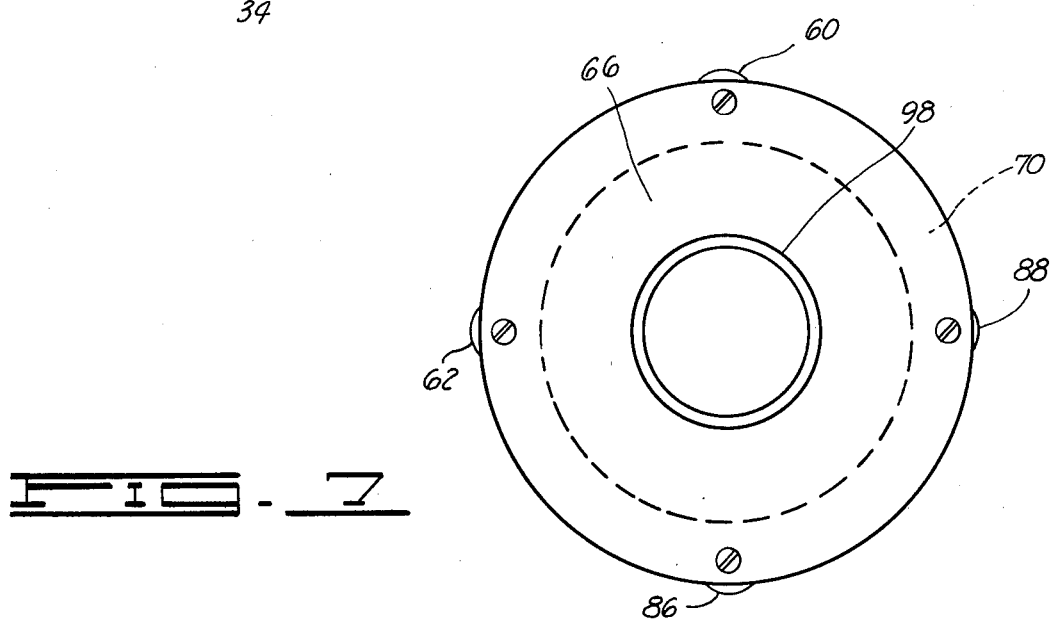
FIG. 7 is an end elevation view of the armature shown in FIG. 6.
Figure 6:
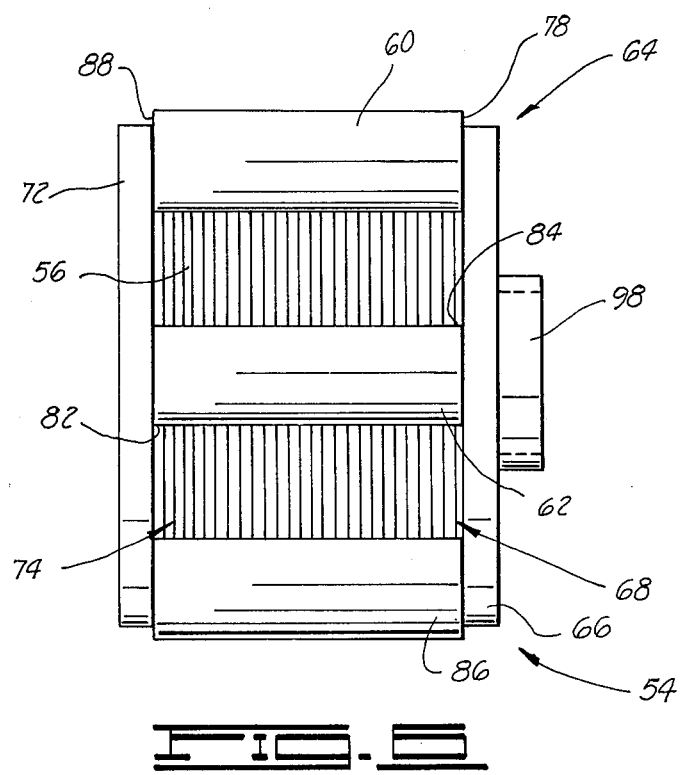
FIG. 6 is a side elvation view of a preferred embodiment armature of the present invention.

Although appropriate armatures as are known in the art (such as those illustrated in FIG. 1) can be used in the armature means 8, a preferred embodiment of an armature 54 to be used in the present invention is illustrated in FIGS. 6 and 7. Broadly, the preferred embodiment armature 54 includes an electrically conductive armature coil 56 and a member having a first armature pole piece 60 and a second armature pole piece 62 radially spaced from the armature coil 56 in electromagnetically responsive relation therewith so that the first armature pole piece 60 has a first magnetic polarization and the second armature pole piece 62 has a second magnetic polarization when the armature coil 56 is electrically energized by a current flowing therethrough. The member further includes a support element 64 having the armature coil 56 radially extending from a central portion or core thereof.

The support element 64 includes a first electromagnetically responsive end piece 66 positioned adjacent a first end 68 of the armature coil 56. As illustrated in phantom in FIG. 7, the first end piece 66 has a peripheral portion 70 extending radially outwardly beyond the armature coil 56. The support element 64 further includes a second electromagnetically responsive end piece 72 connected to the first end piece 66 and positioned adjacent a second end 74 of the armature coil 56. The second end piece 72 likewise has a peripheral portion extending radially outwardly beyond the armature coil 56. In the preferred embodiment the first and second end pieces 66 and 72 are both circularly shaped. When the first and second end pieces 66 and 72 are connected together, a central portion or core section of the armature 54 is defined onto which the armature coil 56 is wound or otherwise placed.

The first armature pole piece 60 has a first end 78 conductively connected to the first end piece 66 along the peripheral portion 70 thereof and has a second end 88 connected to, but insulated from, the second end piece 72 along the peripheral portion thereof. With this connection the first armature pole piece 60 has the same magnetic polarization as the first end piece 66. The second armature pole piece 62 has a first end 82 conductively connected to the second end piece 72 along the peripheral portion thereof and has a second end 84 connected to, but insulated from, the first end piece 66 along the peripheral portion 70 thereof so that the second armature pole piece 62 has the same magnetic polarization as the second end piece 72. Because of the insulation between the second ends 80 and 84 of the first and second armature pole pieces 60 and 62 and the second and first end pieces 72 and 66, respectively, each of the armature pole pieces 60 and 62 is a pure pole. That is, each pole piece carries only a single magnetic polarization. Therefore, each of the first and second armature pole pieces 60 and 62 provides a member which is electromagnetically responsive to the armature coil 56. The armature 56 shown in FIGS. 6 and 7 has four poles 60, 62, 86 and 88 to coincide with the four field poles previously described. Poles 86 and 88 are similar to poles 60 and 62, respectively. Other poles configurations can also be used.

The armature coil 56 is constructed of an electrically conductive material which is disposed around the core of the member 58 and which extends radially between the core and the first and second armature pole pieces 60 and 62. It is to be noted that the armature pole pieces 60 and 62 are spaced radially outwardly from the outer extremity of the armature coil 56.

Regardless of what type of armature is used, each armature has a commutator portion having appropriate electrically conductive commutator segments associated therewith. The commutators of the armatures 44-50 depicted in FIG. 1 are identified by the reference numerals 90, 92, 94 and 96, respectively. For the preferred embodiment of the armature 54 shown in FIGS. 6 and 7, the commutator segments are connected to a commutator collar 98 extending axially from the first end piece 66.

Figure 8:
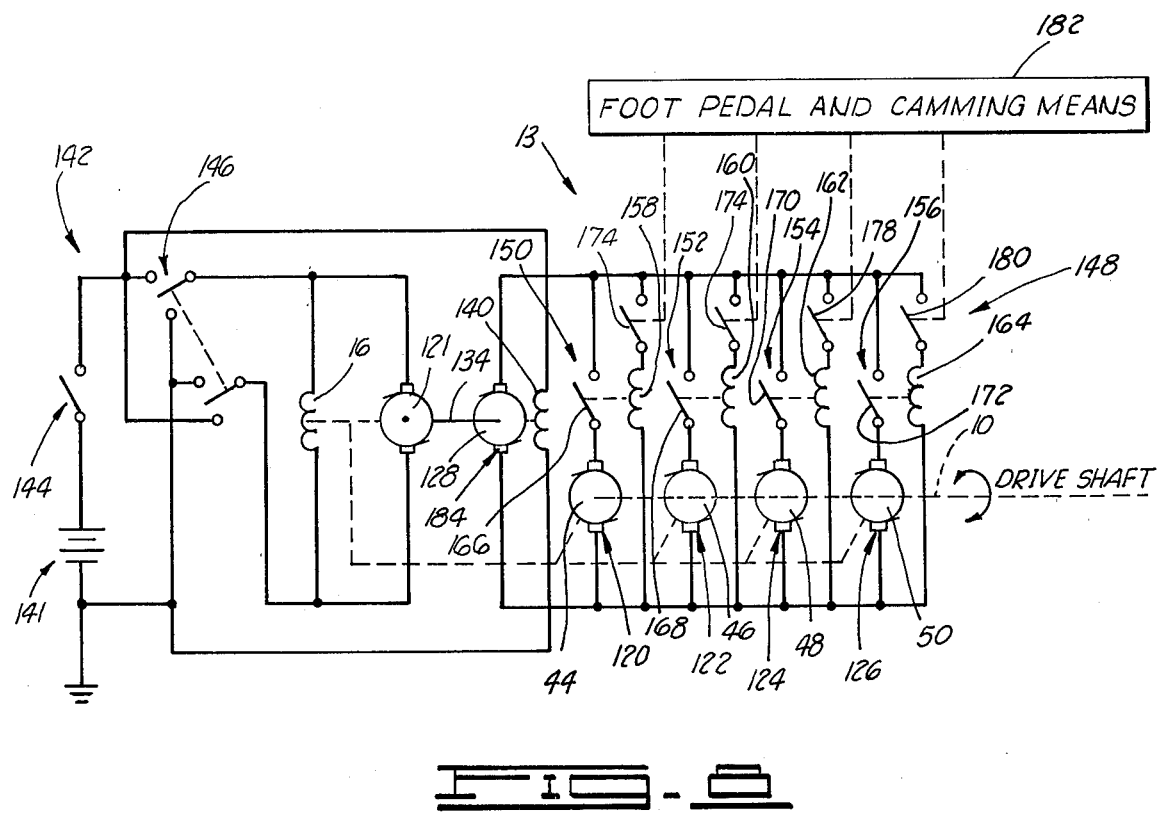
FIG. 8 is a schematic illustration of the interconnections of the electrical and mechanical elements of the preferred embodiment of the present invention.

To provide energization to the commutator segments, the present invention further includes a plurality of brush plates 100, 102, 104 and 106, each of which is associated with a respective one of the armatures 44, 46, 48 and 50. FIG. 5 illustrates the brush plate 100 to be used with the four pole device illustrated in FIG. 1. The brush plate 100 includes an annular support ring 108 having four brush housings 110, 112, 114 and 116 mounted thereon. The support ring 108 includes notches 118 for receiving the four field poles when the brush plate 100 is properly positioned within the FIG. 1 structure for the appropriate timing of the motor. Each brush plate is retained in position relative to the field poles by means of slots formed in the field poles and set screws extending therethrough to secure the brush plate in the desired position. Alternative means of securing the brush plates to the field poles may be used as known in the art. Although not shown in FIG. 5, there are commutator brushes having electrical wires extending therefrom which are to be mounted in respective ones of the brush housings 110-116. These brushes are schematically illustrated in FIGS. 1 and 8 and are identified by reference numerals 120, 122, 124 and 126.

The energy conversion apparatus 2 of the present invention further includes the generator means 12. As shown in FIG. 1, the generator means 12 includes an additional armature 121 having a plurality of pole pieces 130 and a commutator 131 and brush plate 133 associated therewith. The armature 121 is positioned between the first and the second field pole pieces 30 and 32 so that the armature pole pieces 130 interact with the field pole pieces 30 and 32 (and any additional ones) to provide rotational movement independently of the rotational movement of the drive armatures 44-50. This rotational movement is coupled by appropriate means to drive armature energizing means for energizing the drive armatures 44-50. In particular, the coupling means includes a generator drive shaft 134 which is journalled in the bearing structure 28 of the first end plate 20 of the field pole structure 14. In the preferred embodiment the generator drive shaft 134 extends substantially parallel to the first and second field pole pieces 30 and 32 which extend beyond the first end 22 of the field coil 16.

The drive armature energizing means includes a generator 136 of the type known in the art. The generator 136 has a rotor means or generator armature 138 connected to the generator drive shaft 134 for being rotated in a generator field provided by a suitable generator field coil or other appropriate magnetic field source. The field portion of the drive armature energizing means is not shown in FIG. 1 but is schematically illustrated in FIG. 8 and is designated by the reference numeral 140.

The generator means 12 forms part of the source of electrical energy which the present invention converts into mechanical energy. The energization for the field coil 16 and the generator means 12 is provided by a battery 141 which forms another part of the source of electrical energy. Because of the efficiency of the present invention, it is contemplated that the preferred embodiment of the battery 141 can have a nominal voltage of twenty-four volts such as can be provided by two ordinary twelve-volt automobile batteries presently in use.

For controlling the rotation of the drive shaft 10, the present invention further includes the control means 13 for energizing a first one of the drive armatures at a first time and for energizing additional ones of the drive armatures at subsequent times while maintaining previously energized armatures energized. The control means 13 will be more particularly described with reference to FIG. 8 wherein previously described elements are identified by like reference numerals.

FIG. 8 discloses the battery 141 is connected to first switch means 142 which constitutes part of the control means 13 and which controls the direction of rotation of the drive shaft 10 by controlling the direction in which the battery 141 is connected to the field coil 16 thereby controlling the direction of the electromagnetic field generated thereby. In the preferred embodiment the first switch means 142 includes an on/off switch 144 and a forward/reverse directional control switch 146.

The control means 13 further includes second switch means 148 for sequentially connecting each of the armatures 44-50 to the source of electrical energy. The second switch means 148 includes a plurality of relays 150, 152, 154 and 156, each being associated with a respective one of the armatures 44, 46, 48 and 50 as shown in FIG. 8. Each relay includes a respective one of a plurality of electrically conductive relay coils 158, 160, 162 and 164. Each relay also respectively includes one of a plurality of switch elements 166, 168, 170 and 172, responsive to a respective relay coil, for connecting the respective armature, via its brushes and commutator, to the source of electrical energy.

The second switch means 148 further includes a plurality of mechanically actuable switches 174, 176, 178 and 180. Each of the mechanically actuable switches 174–180 is associated with a respective one of the relay coils for connecting the respective relay coil to the source of electrical energy.

As shown in FIG. 8, each of the relay switch elements is connected in series with the brushes of the respective armature brush plate and this series connection is connected in parallel with the output of the drive armature energizing means. Each of the mechanically actuable switches is connected in series with the respective relay coil, and this series connection is likewise connected in parallel to the drive armature energizing means.

The sequential actuation of the drive armatures 44–50 is provided by means for sequentially mechanically actuating the plurality of mechanically actuable switches 174–180. This actuating means is provided in the preferred embodiment by a foot pedal and camming means 182 which sequentially closes the mechanically actuable switches as the foot pedal is depressed.

With reference to FIG. 8, the operation of the preferred embodiment of the present invention will be described. To start the energy conversion apparatus 2, the on/of switch 144 is closed and the directional control switch 146 is placed in either the forward or reverse direction depending on the desired direction of rotation of the drive shaft 10. With these two switch elements properly positioned, the energy provided by the battery 141 is supplied to the field coil 16, the coil 140 of the drive armature energization means, and brushes 184 of the generator means armature 138. This energization causes the drive armature energization means to provide a voltage to each of the drive armatures 44–50. However, this voltage is not applied until the foot pedal and camming means 182 is properly moved to close one or more of the manually actuable switches 174–180. For the preferred embodiment shown in FIG. 8, when the foot pedal is initially depressed to a first predetermined distance, the first manually actuable switch 174 is closed to energize the respective relay coil 158 and close the associated relay switch element 166 thereby energizing the brushes 120 associated with the first armature 44. This energization of the first armature 44 electromagnetically activates the armature pole pieces 52 associated therewith to interact with the field pole pieces electromagnetically energized by the field coil 16. This interaction causes the first armature 44 to rotate thereby rotating the drive shaft 10 and the remaining three armatures 46–50. To increase the speed, the foot pedal is depressed farther to subsequent predetermined positions whereby additional ones of the manually actuable switches are sequentially closed. When the foot pedal is depressed so that all four manually actuable switches 174–180 are closed, all four drive armatures 44–50 are providing input to the rotation of the drive shaft 10. In this way the speed and power delivered from the drive shaft 10 are controlled. When ones of the armatures 44–50 are not actively rotating the drive shaft 10, they can be utilized as generator armatures.

The conversion of electrical energy to mechanical energy provided by the present invention is made more efficient by the previously described construction of parts. For example, the pure field pole and armature pole structure of the disclosed embodiment assist in the more efficient conversion of electrical energy to mechanical energy. The pure field poles are provided by a single drive armature field structure constructed as previously described.

Thus, the present invention for an energy conversion apparatus is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An energy conversion apparatus, comprising:
    an electrically conductive field coil;
    a first field pole piece;
    means for electromagnetically associating said first field pole piece with said field coil so that said first field pole piece has a first magnetic polarity;
    a second field pole piece;
    means for electromagnetically associating said second field pole piece with said field coil so that said second field pole piece has a second magnetic polarity;
    two drive armatures disposed along a common axis, each armature having two armature pole means, including pole pieces radially positioned between said common axis and said first and second field pole pieces, for interacting with the magnetic polarities of said field pole pieces, to provide rotational movement about the common axis; and
    control means for energizing the armature pole means of a first one of said two drive armatures at a first time and for energizing the armature pole means of a second one of said two drive armatures at a second time while maintaining the armature pole means of said first armature energized.

2. An energy conversion apparatus, comprising:
    a drive shaft;
    an electrically conductive field coil;
    a field pole structure electromagnetically coupled with said field coil, said field pole structure including:
        a first field pole extending substantially parallel to said drive shaft in radially spaced relation therewith and having a first magnetic polarity; and
        a second field pole extending substantially parallel to said drive shaft in radially spaced relation therewith and having a second magnetic polarity;
    a first drive armature connected to said drive shaft, said first drive armature having a plurality of armature pole pieces spaced radially between said drive shaft and said first and second field poles and said first drive armature further having a first drive armature coil;
    a second drive armature connected to said drive shaft in axially spaced relation with said first drive armature, said second drive armature having a plurality of armature pole pieces spaced radially between said drive shaft and said first and second field poles and said second drive armature further having a second drive armature coil; and
    control means for energizing one of said first and second drive armature coils at a first time and for energizing the other one of said first and second drive armature coils at a second time while maintaining the initially energized armature coil energized.

3. An energy conversion apparatus, comprising:
a drive shaft;
an electrically conductive field coil;
a field pole structure electromagnetically coupled with said field coil, said field pole structure including:
  a first field pole extending substantially parallel to said drive shaft in radially spaced relation therewith and having a first magnetic polarity;
  a second field pole extending substantially parallel to said drive shaft in radially spaced relation therewith and having a second magnetic polarity;
  a support member for supporting a field coil, said support member including:
    a first end plate being disposed adjacent a first end of said field coil and extending radially beyond said field coil; and
    a second end plate disposed adjacent a second end of said field coil and extending radially beyond said field coil along a line substantially perpendicular to the line along which said first end plate extends beyond said field coil;
  said first field pole being connected in magnetic relation with said first end plate and extending substantially perpendicularly therefrom; and
  said second field pole being connected in magnetic relation with said second end plate and extending substantially perpendicularly therefrom; and
a first drive armature connected to said drive shaft, said first drive armature having a plurality of armature pole pieces spaced radially between said drive shaft and said first and second field poles.

4. An apparatus as defined in claim 3, wherein:
said first and second field poles extend beyond the second end of said field coil;
said drive shaft extends substantially coaxially with said field coil beyond the second end thereof; and
said apparatus further comprises a second drive armature connected to said drive shaft and having a plurality of armature pole pieces spaced radially between said drive shaft and said first and second field poles.

5. An apparatus as defined in claim 4, wherein:
said first drive armature further has first current conducting means for electromagnetically energizing said armature pole pieces of said first drive armature;
said second drive armature further has second current conducting means for electromagnetically energizing said armature pole pieces of said second drive armature; and
control means for energizing one of said first and second current conducting means at a first time and for energizing the other of said first and second current conducting means at a second time while maintaining the initially energized current conducting means energized.

6. An apparatus as defined in claim 4, wherein each of said first and second drive armatures includes:
an electrically conductive armature coil; and
a member having a first armature pole piece and a second armature pole piece radially spaced from said armature coil in electromagnetically responsive relation therewith so that said first armature pole piece has a first magnetic polarization and said second armature pole piece has a second magnetic polarization when said armature coil is electrically energized, said first and second armature pole pieces forming at least a part of said plurality of armature pole pieces.

7. An apparatus as defined in claim 4, wherein:
said first and second field poles extend beyond the first end of said field coil; and
said apparatus further comprises:
  a generator drive shaft extending substantially parallel to said first and second field poles beyond the first end of said field coil;
  a third armature connected to said generator drive shaft, said third armature having a plurality of pole pieces for interacting with said first and second field poles; and
  a drive armature energizing means, having rotor means connected to said generator drive shaft, for energizing said first and second drive armatures.

8. An apparatus as defined in claim 7, wherein:
said first drive armature further has first current conducting means for electromagnetically energizing said armature pole pieces of said first drive armature;
said second drive armature further has second current conducting means for electromagnetically energizing said armature pole pieces of said second drive armature; and
control means for energizing one of said first and second current conducting means at a first time and for energizing the other of said first and second current conducting means at a second time while maintaining the initially energized current conducting means energized.

9. An apparatus as defined in claim 7, wherein each of said first and second drive armature includes:
an electrically conductive armature coil; and
a member having a first armature pole piece and a second armature pole piece radially spaced from said armature coil in electromagnetically responsive relation therewith so that said first armature pole piece has a first magnetic polarization and said second armature pole piece has a second magnetic polarization when said armature coil is electrically energized, said first and second armature pole pieces forming at least a part of said plurality of armature pole pieces.

10. An apparatus for converting electrical energy from a source thereof to mechanical energy, comprising:
an electrically conductive field coil;
first switch means for reversibly connecting the source of electrical energy to said field coil;
a plurality of armatures, electromagnetically responsive to said field coil, for providing rotational movement along a common axis; and
second switch means for sequentially connecting each of said armatures to the source of electrical energy.

11. An apparatus as defined in claim 10, wherein said second switch means includes:
a plurality of relays, each being associated with a respective one of said armatures and each having an electrically conductive relay coil and also having a switch element, responsive to said relay coil, for connecting the respective armature to the source of electrical energy;

a plurality of mechanically actuable switches, each being associated with a respective one of the relay coils for connecting the respective relay coil to the source of electrical energy; and means for sequentially mechanically actuating said plurality of mechanically actuable switches.

12. An apparatus as defined in claim 11, further comprising:

a battery connected to said first switch means; and generator means, responsive to said field coil, for providing an electrical output connectable to said armatures, said battery and said generator means forming said source of electrical energy.

13. An energy conversion apparatus, comprising:

a support member having a first end plate and a second end plate;

electrical conductor means mounted on said support member for establishing an electromagnetic field when said electrical conductor means conducts a current;

a first linearly extending field pole connected with said first end plate and spaced from said second end plate;

a second linearly extending field pole connected with said second end plate and spaced from said first end plate;

a drive shaft;

means for retaining said drive shaft between, and in substantially parallel relation with, said first and second field poles and in substantially coaxial relationship with said first support member;

a first drive armature mounted on said drive shaft, said first drive armature having first and second armature pole pieces positioned radially between said drive shaft and said first and second field poles and further having first commutator means; and a second drive armature mounted on said drive shaft, said second drive armature having third and fourth armature pole pieces positioned radially between said drive shaft and said first and second field poles and further having second commutator means.

* * * * *